United States Patent [19]
Kishi et al.

[11] Patent Number: 6,045,898
[45] Date of Patent: Apr. 4, 2000

[54] RESIN COMPOSITIONS FOR FIBER-REINFORCED COMPOSITE MATERIALS AND PROCESSES FOR PRODUCING THE SAME, PREPREGS, FIBER-REINFORCED COMPOSITE MATERIALS, AND HONEYCOMB STRUCTURES

[75] Inventors: Hajime Kishi; Masahiko Hayashi; Toshiaki Higashi; Nobuyuki Odagiri, all of Ehime, Japan

[73] Assignee: Toray Industried, Inc., Japan

[21] Appl. No.: 08/930,774

[22] PCT Filed: Jan. 31, 1997

[86] PCT No.: PCT/JP97/00250

§ 371 Date: Jan. 5, 1998

§ 102(e) Date: Jan. 5, 1998

[87] PCT Pub. No.: WO97/28210

PCT Pub. Date: Aug. 7, 1997

[30] Foreign Application Priority Data

Feb. 2, 1996 [JP] Japan ................................. 8-040483

[51] Int. Cl.⁷ .......................................................... B32B 7/00
[52] U.S. Cl. ........................... 428/245; 428/241; 523/440; 523/466; 525/107; 525/523
[58] Field of Search ........................... 523/440, 466; 525/523, 107; 428/241, 245, 290

[56] References Cited

U.S. PATENT DOCUMENTS

| | | | |
|---|---|---|---|
| 4,147,578 | 4/1979 | Koss | 156/245 |
| 4,320,047 | 3/1982 | Murphy et al. | 523/457 |
| 4,482,660 | 11/1984 | Minamisawa et al. | 523/468 |
| 4,500,582 | 2/1985 | King et al. | 428/116 |
| 4,500,660 | 2/1985 | Minamisawa et al. | 523/468 |
| 5,030,698 | 7/1991 | Mulhaupt et al. | 525/438 |
| 5,557,831 | 9/1996 | Kishi et al. | 28/167 |
| 5,626,916 | 5/1997 | Kishi et al. | 427/386 |

FOREIGN PATENT DOCUMENTS 60-058419  4/1985  Japan.

*Primary Examiner*—Robert Dawson
*Assistant Examiner*—D. Aylward
*Attorney, Agent, or Firm*—Morrison & Foerster, LLP

[57] ABSTRACT

The present invention provides a prepreg having an excellent self adhesiveness to a honeycomb core, a low porosity when used as skin panels, an excellent surface smoothness due to a low surface porosity, and good tackiness and drapability. This invention also provides a honeycomb sandwich panel having a skin panel peel strength, an excellent impact resistance and an excellent hot water resistance, and a composition for a fiber reinforced composite material made from the prepreg and honeycomb sandwich panel. The fiber reinforced composite material made from the prepreg of the present invention can be used for airplanes, automobiles and other industrial applications, particularly as structural materials of airplanes, because of its excellent mechanical properties.

22 Claims, No Drawings

ND HONEYCOMB STRUCTURES

TECHNICAL FIELD

The present invention relates to an epoxy resin composition suitable as a matrix resin composition of a fiber reinforced composite material, and also to a prepreg. In more detail, it relates to a prepreg which has good self adhesiveness to a honeycomb core and gives a construction of a honeycomb structure, skin panels of which are of low porosity and also relates to its matrix-resin composition. Furthermore, it relates to a prepreg which is excellent in tackiness, less in temporal change of tackiness, and gives a construction with skin panels having less pits and dents on the surfaces, and also relates to its matrix resin composition. Moreover, it relates to a honeycomb structure obtained from the foregoing.

BACKGROUND ART

Fiber reinforced composite materials consisting of reinforcing fibers and a matrix resin are widely used for airplanes, automobiles and other industrial applications, since they are excellent in mechanical properties. In recent years, as the fiber reinforced composite materials may become more widely adopted, they are required to have more excellent properties to meet more severe requirements. To let the fiber reinforced composite materials manifest their mechanical properties and durability sufficiently, it is important to decrease the defects resulting in the decline of strength. Especially for structural materials of airplanes, in view of weight reduction, it is more frequently practiced to use a fiber reinforced composite material as skin panels to be incorporated into a honeycomb sandwich panel. Honeycomb cores are made of aramid or aluminum. In particular, it is general practice to produce a honeycomb sandwich panel by laminating prepreg layers on both sides of a honeycomb core, and co-curing to cure the prepreg layers and to bond the prepreg layers and the honeycomb core simultaneously.

In this case, the bonding strength between the honeycomb core and the prepreg layers laminated as skin panels is important. Conventionally it is popular practice to use a structural adhesive film between the honeycomb core and each of the prepreg layers, for co-curing. However, to further reduce the weight of the honeycomb sandwich panel and to reduce the cost of fabricating, it is desired to self-bond the honeycomb core and the prepreg layers without using any adhesive film.

However, if they are bonded without using any adhesive film, the resin existing in the prepreg layers must migrate into the honeycomb core to sufficiently wet the honeycomb walls, instead of the resin in the adhesive films, and it has been a very difficult problem to achieve a high bonding strength. The cured portions of the resin sinking or rising along the honeycomb walls in the thickness direction of the honeycomb core from the laminated prepreg layers are called fillets, and it is difficult to form the fillets sufficiently between the honeycomb core and the skin panels. If the viscosity of the resin is too low, the resin of the top skin panel tends to flow down too much along the honeycomb walls, and as a result, the bonding strength between the top skin panel and the honeycomb core becomes insufficient. On the other hand, if the resin viscosity is too high, the resin cannot sufficiently wet the honeycomb walls, and especially the bonding strength between the bottom skin panel and the honeycomb core is liable to be insufficient.

On the other hand, since the resin existing in the prepreg layers must be distributed toward the honeycomb core walls, the absolute amount of the resin in the laminated prepreg layers becomes insufficient, and, disadvantageously, pores are likely to be formed in the skin panels. In the case of honeycomb structure, since the pressure for fabricating it does not act on the prepreg layers at the portions above and below the hexagonal voids of the honeycomb core, pores are more likely to be formed as compared with a case of fabricating an ordinary prepreg laminate.

Furthermore, conventionally it is popular practice to stick a structural adhesive film on the surface of each prepreg layer to be laminated, and to cure it together with the prepreg layer for decreasing such defects as pits, dents and resin blurs on the surface of the skin panel. However, to further reduce the weight of the honeycomb sandwich panel and to reduce the material cost and fabricating cost, it is desirable to mold a skin panel with a smooth and defectless surface without sticking the adhesive film to the surface. However, if no adhesive film is used, the amount of the resin remaining at the surface of the skin panel is relatively less since there is no resin corresponding to the resin of the adhesive film, and it has been a difficult problem to achieve a high grade surface condition.

Prior art concerning prepregs and matrix resins with carbon fibers as reinforcing fibers intended to be used for honeycomb fabricating include the following.

U.S. Pat. No. 4,500,660 discloses an epoxy resin composition prepared by adding dicyandiamide to a specific epoxy resin, a reaction product of butadiene acrylonitrile copolymer with functional groups at both the ends and an epoxy resin. The object of the invention is to improve the self adhesiveness between the prepreg layers and the honeycomb and the interlayer shear strength of the skin panels.

JP-A-58-82755 states that if a composition consisting of an epoxy resin and a reaction product of a liquid butadiene acrylonitrile copolymer and an epoxy resin, with dicyandiamide and diaminodiphenylsulfone used together as curing agents is used, the self adhesiveness between the prepreg layers and the honeycomb core is excellent, and that especially the bonding strength at high temperature is high, while the honeycomb sandwich panel does not have any defects on the surfaces.

U.S. Pat. No. 5,557,831 states that the use of a highly thixotropic resin as a woven fabric prepreg to be co-cured into a honeycomb effectively lowers the porosity in the skin panel.

On the other hand, what often come into question in the use of a prepreg are the tackiness and drapability of the prepreg. These properties greatly affect the working convenience in handling the prepreg.

If the tackiness of a prepreg is too small, the overlapped and pressed prepreg is soon peeled, to render inconvenient the laminating operation. In this case, the working environment temperature must be raised to obtain moderate tackiness. On the contrary, if the tackiness of the prepreg is too large, the prepreg overlapped in error adheres due to its own weight, and later peeling for correction becomes difficult.

If the drapability of the prepreg is poor, the lamination work efficiency remarkably declines since the prepreg is hard, and in addition, the laminated prepreg does not accurately suit the curved surface of a mold or the form of a mandrel, and is thus creased or its reinforcing fibers broken, generating defects in the fabricated product. Also in this case, the working environment temperature must be kept high, and since it is difficult to keep balance with the tackiness, this is a very great problem in fabrication.

The tackiness and drapability of a prepreg are mainly dominated by the viscoelasticity of the matrix resin. In general, the viscoelasticity of an epoxy resin greatly depends on the temperature, and if the working environment temperature changes, tackiness and drapability change, preventing application as the case may be.

Furthermore, even if a relatively large amount of a resin exists at the surface to provide moderate tackiness immediately after production of a prepreg, the resin sinks inside with the lapse of time, in a temporal tendency to gradually decrease the tackiness. If the resin viscosity is relatively high, the temporal change of tackiness tends to be small, but on the other hand, drapability is likely to be low. That is, if conventional resins are used, there is a problem that either tackiness or drapability becomes poor.

For improving the tackiness, etc. of a prepreg, it is known to add a high polymer such as a thermoplastic resin or elastomer to an epoxy resin. For example, U.S. Pat. No. 4,859,533 discloses a method of adding polyvinyl formal resin. However, if a high polymer is added in a large amount, the resin viscosity rises, to lower drapability. Because of this restriction, especially for a prepreg using carbon fibers with a high elastic modulus, it has been difficult to find a resin satisfactory both in tackiness and drapability.

U.S. Pat. No. 5,030,698 discloses an epoxy resin composition which is composed of a segmented copolymer consisting of a liquid copolymer and a copolyester, copolyamide, etc. based on an epoxy resin, butadiene and acrylonitrile, to be used as a structural hot melt adhesive, matrix resin or surface paint. As in the above case, the problem of improving tackiness without sacrificing drapability and impregnability is not discussed at all, and no means for solving it is suggested. In addition, if such a liquid copolymer based on butadiene and acrylonitrile is added, the heat resistance and elastic modulus of the cured resin composition decline, and the fiber reinforced composite material obtained by curing a prepreg with such a resin composition as the matrix resin does not have properties such as heat resistance and 0° compressive strength which are sufficiently good.

International Application WO 96/02592 states that a prepreg in which an epoxy resin composition containing a polyamide based or polyester based thermoplastic elastomer is used as the matrix resin is excellent both in drapability and tackiness. However, the improvement of the surface smoothness of a honeycomb sandwich panel is not discussed at all, and no means for solving the problem of providing it is suggested.

OBJECTS OF THE INVENTION

The techniques disclosed in these prior arts do not give sufficient self adhesiveness between the skin panels and the honeycomb core, or are not intended to decrease the porosity of the skin panels, there being no statement of any effect concerning them. Furthermore, the surface smoothness obtained when cured prepreg layers are laminated as the surfaces of skin panels of a honeycomb sandwich panel without sticking adhesive films on the surfaces of the skin panels is not sufficient when using the techniques disclosed in the above prior arts, and moreover, any technique which improves the surface smoothness of panels and the tackiness and drapability of a prepreg and decreases the temporal change of tackiness is not found at all. That is, it has been a very difficult problem to design a prepreg and its matrix resin, which satisfy all of high self adhesiveness between the skin panels and the honeycomb, low porosity in the skin panels, better surface smoothness of the skin panels of the honeycomb sandwich panel, and the tackiness and drapability of the prepreg. The object of the present invention is to provide a prepreg excellent in self adhesiveness to the honeycomb, lower in the porosity of the skin panels, less in the surface defects of the honeycomb sandwich skin panel, and excellent in the tackiness and drapability of the prepreg, and also to provide its matrix resin composition, and a honeycomb structure obtained by fabricating it. The prepreg of the present invention is also advantageously easy to handle since it has good drapability, and furthermore, since its fabricated product can be used as an excellent structural material since it is high in heat resistance; toughness and impact resistance.

DISCLOSURE OF THE INVENTION

To solve the above problem, the resin composition of the present invention has the following constitution.

A resin composition for a fiber reinforced composite material of which the components [A], [B] and [C] are essential, wherein the modulus of storage rigidity G' measured by parallel plates having vibration frequency of 0.5 Hz during elevating temperature from 50° C. at 1.5° C./min is in a range of 5 to 200 Pa in an entire range of 70° C. to 100° C.:

[A] Epoxy resin
[B] Curing agent
[C] Additives

As a second version, the resin composition of the present invention has the following constitution.

A resin composition for a fiber reinforced composite material of which the components [A], [B] and [C] are essential, wherein the minimum modulus of storage rigidity G' min and the maximum modulus of storage rigidity G' max at 70° C. to 100° C. measured by parallel plates having vibration frequency of 0.5 Hz during elevation of temperature from 50° C. at 1.5° C./min, satisfy the following relation:

[A] Epoxy resin
[B] Curing agent
[C] Additives
log 10 (G' max/G' min)≦0.9

As a third version, the resin composition of the present invention has the following constitution.

A resin composition for a fiber reinforced composite material of which the components [A], [B] and [C] are essential, wherein the thixotropy index is in a range of 2.5 to 40, the resin viscosity at 80° C. measured by parallel plates having vibration frequency of 0.5 Hz during elevation of temperature from 50° C. at 1.5° C./min is in a range of 100 to 1000 poises, and 30 to 400 poises in the minimum value of resin viscosity during heating:

[A] Epoxy resin
[B] Curing agent
[C] Additives

As a fourth version, the resin composition of the present invention has the following constitution.

A resin composition for a fiber reinforced composite material of which the components [A], [B] and [C] as essential ingredients, wherein solid rubber and fine silica particles are contained as component [C] in an amount of 1 to 10 wt %, respectively, based on the total weight of the resin composition:

[A] Epoxy resin

[B] Curing agent

[C] Additives

THE MOST PREFERRED EMBODIMENTS OF THE INVENTION

The tackiness and drapability of a prepreg and the flowability of a resin during the curing operation has a correlation with the viscoelasticity of its matrix resin, and the parameter concerning viscoelasticity is important for resin design. The viscoelasticity of a resin is usually measured by dynamic viscoelasticity measurement using parallel plates. The dynamic viscoelasticity depends on the measuring temperature and measuring frequency. The inventors found that if the modulus of storage rigidity G' measured at a vibration frequency of 0.5 Hz is in said specific range, the prepreg has excellent tackiness, small temporal change of tackiness and a suitable drapability, and if this prepreg is used as skin panel of a honeycomb structure, the surface smoothness after curing is excellent. Thus, the present invention has been completed. If the modulus of storage rigidity G' is too high, the impregnation with the resin for preparation of a prepreg is difficult, and the drapability of the prepared prepreg declines remarkably. If G' is too low, on the contrary, the prepreg is likely to have insufficient tackiness and to greatly change in tackiness with the lapse of time, and furthermore, the surface smoothness of the skin panels of the honeycomb sandwich declines remarkably. Furthermore, when a unidirectional prepreg is used, form retainability may decline. For these reasons, the modulus of storage rigidity G' of the resin composition of the present invention must be in a range of 5 to 200 Pa, preferably in a range of 10 to 100 Pa in an entire range of 70° C. to 100° C. Furthermore, the modulus of storage rigidity G' is preferably in a range of 5 to 200 Pa in a temperature range of 70° C. to 110° C. If the dependency of the viscoelasticity function of the epoxy resin composition on temperature is small, the handling convenience is less affected by the change in the temperature of the working environment where the prepreg is handled, and it is effective in keeping the temporal change of tackiness small when the prepreg is allowed to stand. It is also preferable to lessen the surface defects of the skin panel. Therefore, with regard to the temperature dependency of G', the maximum modulus of storage rigidity G' max and the minimum modulus of storage rigidity G' min must satisfy log 10 (G' max/G' min)≦0.9, preferably log 10 (G' max/G' min) ≦0.7, more preferably log 10 (G' max/G' min)≦0.5 in an entire range of 70° C. to 100° C. If the range in which the temperature dependency of G' is small extends over a wider temperature range, higher effect can be achieved, and the temperature range in which the above characteristic is maintained is preferably 70° C. to 110° C., more preferably 70° C. to 130° C. It is more preferable to satisfy both the conditions that the G' in the above temperature range is in a range of 5 to 200 Pa at least in an entire range of 70° C. to 100° C., and that the G' conforms to log 10 (G' max/G' min) ≦0.9.

It has been also found that if the thixotropy index is in a range of 2.5 to 40, if the resin viscosity measured at 80° C. by parallel plates having vibration frequency of 0.5 Hz during elevation of temperature from 50° C. at 1.5° C./min is in a range of 100 to 1000 poises, and if the minimum value of resin viscosity during heating is in a range of 30 to 400 poises, then the self adhesiveness to the honeycomb can be effectively improved while the porosity of the skin panels can be effectively lowered. The thixotropy index in this case is defined as ratio $\eta_{0.01}/\eta_{1.0}$ where $\eta_{0.01}$ is the viscosity measured by parallel plates of 0.01 Hz in vibration frequency at 70° C. and $\eta_{1.0}$ is the viscosity measured by parallel plates of 1 Hz in vibration frequency. By selecting the component [C], a resin composition of 2.5 to 40 in thixotropy index can be obtained. If the thixotropy index is less than 2.5 or more than 40, when the matrix resin is used as a prepreg, the fillet formability in the honeycomb core and self adhesiveness decline. More preferably, the thixotropy index is in a range of 5 to 30. If a resin composition of less than 100 poises in viscosity at 80° C. or less than 30 poises in minimum viscosity is used, the tackiness of the prepreg tends to decline with the lapse of time, and the porosity of the fabricated product tends to increase. On the other hand, if a resin composition of more than 1000 poises in viscosity at 80° C. or more than 400 poises in minimum viscosity is used, the fillet formability in the honeycomb core and self adhesiveness tend to decline. More preferable is a resin composition having a viscosity at 80° C. kept in a range of 100 to 500 poises and a minimum value of resin viscosity during heating kept in a range of 50 to 250 poises.

The modulus of storage rigidity and the viscosity of the resin composition can be optimized in said ranges, for example, by properly selecting the kind, viscosity, molecular weight, number of functional groups and mixing ratio of the resin, and the kinds, molecular weights, degrees of branching, amounts, etc. of the additives used (e.g., an elastomer, a thermoplastic resin soluble in the epoxy resin, or inorganic and organic particles). If these molecular weights and amounts are larger, the modulus of storage rigidity and viscosity tend to be larger. Especially various elastomers and fine particles are effective for optimizing the modulus of storage rigidity and viscosity.

The respective components of the present invention are described below.

In the present invention, the component [A] is an epoxy resin. As the epoxy resin, especially an epoxy resin with an amine, a phenol or a compound with a carbon-carbon double bond as a precursor is preferable. The epoxy resin with an amine as a precursor can be any of various isomers such as tetraglycidyl diaminodiphenylmethane, triglycidyl-p-aminophenol and triglycidyl aminocresol. Since tetraglycidyl diaminodiphenylmethane is excellent in heat resistance, it is preferable as a resin for a composite material used as structural materials of airplanes.

The epoxy resin with a phenol as a precursor can be any of bisphenol A type epoxy resin, bisphenol F type epoxy resin, bisphenol S type epoxy resin, phenol novolak type epoxy resin, cresol novolak type epoxy resin and resorcinol type epoxy resin. In the case of liquid bisphenol A type epoxy resin or bisphenol F type epoxy resin, since either is low in viscosity, it is preferable to add another epoxy resin or additive.

The epoxy resin with a naphthalene skeleton is preferable since a setting resin low in water absorption and high in heat resistance can be provided. Furthermore, biphenyl type epoxy resin, dicyclopentadiene type epoxy resin and diphenylfluorene type epoxy resin can also be suitably used since they give setting resins low in water absorption.

These epoxy resins can be used singly or in any proper combination. To use at least a bifunctional epoxy resin and a trifunctional or higher functional epoxy resin together is preferable since resin flowability and heat resistance after curing can be satisfied. Especially a combination of glycidylamine type epoxy resin and glycidyl ether type epoxy resin is preferable since all of heat resistance, water resistance and processability can be satisfied. Furthermore, using at least one epoxy resin liquid at room temperature and one epoxy resin solid at room temperature together is preferable since the tackiness and drapability of the prepreg can be appropriate.

The following combination of epoxy resins is especially preferable. The respective amounts of the following epoxy resins should be selected from the following ranges:

| | |
|---|---|
| Bisphenol type epoxy resin | 30~80% |
| Novolak type epoxy resin | 0~35% |
| Tetraglycidyl diaminodiphenylmethane | 10~45% |

The component [B] is a curing agent. As the curing agent, a compound with an active group capable of reacting with an epoxy group can be used. Preferably compounds having an amino group, acid anhydride group or azido group are suitable. They include, for example, various isomers of dicyandiamide, diaminodiphenylmethane and diaminodiphenylsulfone, aminobenzoates, various acid anhydrides, phenol novolak resins, cresol novolak resins, polyphenol compounds, imidazole derivatives, aliphatic amines, tetramethylguanidine, thiourea-amine adducts, carboxylic anhydrides such as methylhexahydrophthalic anhydride, carboxylic acid hydrazides, carboxylic acid amides, polymercaptan and Lewis acid complexes such as a boron trifluoride ethylarnine complex. If an aromatic diamine is used as a curing agent, a cured epoxy resin product good in heat resistance can be obtained. Especially various isomers of diaminodiphenylsulfone are most suitable for obtaining cured products good in heat resistance. It is preferable to add these in an amount sufficient to reach an equivalent stoichiometrically, and as the case may be, using such an isomer in an amount of about 0.7 to 0.8 in equivalent ratio is preferable since a resin with a high elastic modulus can be obtained. One or more in combination of these curing agents can be used. If a combination of dicyandiamide and a urea compound such as 3,4-dichlorophenyl-1,1-dimethylurea, or an imidazole is used as a curing agent, high hot water resistance can be obtained preferably even though curing can be achieved at a relatively low temperature. Curing by an acid anhydride is preferable since a cured product lower in water absorption can be obtained as compared with curing by an amine compound. Moreover, if any of these curing agents is microencapsulated, for example, the storage stability of the prepreg can be improved, and especially tackiness and drapability are unlikely to change even if the prepreg is allowed to stand at room temperature.

Furthermore, a preliminary reaction product of total or partial amounts of the epoxy resin and the curing agent can also be added to the composition. This method may be effective for viscosity adjustment and storage stability improvement.

The components [C] are additives and play a role in changing the viscoelasticity of the resin composition for optimizing the modulus of storage rigidity, viscosity and thixotropy. They can be preferably one or more selected from solid rubbers, liquid rubbers, thermoplastic resin elastomers, thermoplastic resins, organic and inorganic particles and short fibers, etc.

In general, if a solid rubber is dissolved in an epoxy resin, the viscosity rises greatly, as compared with a case of dissolving the same amount of a liquid rubber, and while the resin composition can be kept at a moderate viscosity during fabricating, the heat resistance of the fabricated product can be preferably kept relatively high. In this case, since the dependency of the viscoelasticity function of the resin composition on temperature is decreased, the handling convenience is less likely to be lowered even if the temperature of the working environment where the prepreg is handled changes, and even if the prepreg is allowed to stand, the tackiness changes less with the lapse of time, while the skin panel as the cured product is improved in surface smoothness. As the solid rubber, acrylonitrile-butadiene copolymer as a random copolymer of butadiene and acrylonitrile is preferable in view of compatibility with the epoxy resin. By changing the copolymerization ratio of acrylonitrile, the compatibility with the epoxy resin can be controlled. Furthermore, to improve the adhesiveness to the epoxy resin, a solid rubber with functional groups is more preferable. The functional groups include carboxyl groups, amino groups, etc. Especially solid acryloritrile-butadiene rubber containing carboxyl groups is preferable. Hydrogenated nitrile rubber is also preferable since it is excellent in weather resistance. Marketed products of these solid rubbers include NIPOL1072, NIPOL1072J, NIPOL1472, NIPOL1472HV, NIPOL1042, NIPOL1043, NIPOLDN631, NIPOL1001, ZETPOL2020, SETPOL2220, SETPOL3110 (respectively produced by Nippon Zeon Co., Ltd.).

It is preferable that the component [C] has functional groups because they react with epoxy groups while it is mixed with an epoxy resin, the molecular weight is raised to some extent, and a branched structure is formed. Accordingly, when the prepreg is allowed to stand, the temporal change of tackiness can be inhibited, and the cured skin panel is enhanced in surface smoothness. If such a preliminary reaction is positively adopted, excellent surface smoothness can be obtained, and the temporal change in the tackiness of the prepreg can be effectively inhibited. Thus, the required amount of the component [C] added can be smaller, as compared with a case of using no preliminary reaction. For example, the surface smoothness which an be achieved by adding 7 wt % of the component [C] without any preliminary reaction can be achieved by about 3 wt % of the component [C] if the component [C] and the epoxy resin are caused to preliminary react by heating. The preliminary reaction is usually executed by mixing under heating, and mixing at 70° C. to 120° C. for more than 30 minutes is preferably effective for improving the surface smoothness and inhibiting the temporal change of tackiness. Mixing at 70 to 100° C. for more than 1 hour is more preferable. However, if the preliminary reaction is executed to too great an extent, the resin viscosity may become so high as to inconvenience the process necessary for prepreg production such as film formation or impregnation into fibers. Therefore, the preliminary reaction is preferably executed by mixing in a temperature range of 70 to 85° C. for 1 to 3 hours. When the component [C] is caused to preliminary react with the epoxy resin, it is preferable to let it react with an epoxy resin smaller in the number of functional groups, and then with an epoxy resin larger in the number of function groups, for example, a tetrafunctional epoxy resin, since the thickening degree is easier to control. For the same reason, the epoxy resin with functional groups corresponding to a tetrafunctional or higher functional epoxy resin preferably accounts for 60% or less in the entire epoxy composition.

As an ingredient of the component [C], inorganic particles can also be preferably used, which can be selected from talc, aluminum silicate, fine silica particles, calcium carbonate, mica, montmorillonite, smectites, carbon black, silicon carbide, alumina hydrate, etc. These inorganic particles are highly effective for rheology control, i.e., thickening and thixotropy manifestation. Among them, fine silica particles are known to be large in the effect of thixotropy manifestation when added to a resin composition, and in addition, are preferably effective for decreasing the dependency of the viscoelasticity function of the resin composition on temperature, for lowering to a lesser extent the handling convenience even if the temperature of prepreg handling environment changes, for lessening the temporal change of tackiness when the prepreg is allowed to stand, for improving the surface smoothness of the cured skin panel, and for improving the self adhesiveness to the honeycomb core. As fine silica particles with silicon dioxide as the basic skeleton, for example, particles having average primary particle size of 5 to 40 nm are marketed under a trade name of Aerosil (Nippon Aerosil K.K.). If the primary particle size is as small as 40 nm or less, a sufficient thickening effect is preferably given. The particle size is evaluated by an electron microscope. The specific area is preferably in a range of 50 to 400 $m^2/g$. Silica particles covered with silanol groups on the surfaces are generally used, and hydrophobic fine silica particles in which the hydrogen atoms of silanol groups are substituted by methyl groups, octyl groups, dimethylsilyl groups, trimethylsilyl groups or dimethylsiloxane groups, etc. can be preferably used for thickening the resin, stabilizig the thixotropy and improving the mechanical properties such as water resistance and compressive strength of the fabricated product.

When a solid rubber is used as an ingredient of the component [C], the amount is preferably 1 to 10 wt % based on the total weight of the resin composition. If the amount is less than 1 wt %, the prepreg is poor in tackiness, and pits and resin blurs are likely to occur on the surfaces of the skin panels of the honeycomb structure. Furthermore, pores are liable to be formed in the skin panels. On the other hand, if the amount is more than 10 wt %, the resin viscosity is so high as to be likely to make the impregnation into the prepreg difficult, and the self adhesiveness to the honeycomb core also declines. A more preferable range is 2 to 7 wt % and a still more preferable range is 2.5 to 5 wt %.

The mixing of a solid rubber and an epoxy resin can be achieved by roll kneading or kneading by a kneader under pressurization, or dissolving them into a common solvent such as acetone or methyl ethyl ketone and removing the solvent by drying. Especially when the solid rubber has functional groups capable of reacting with epoxy groups, mixing in a solvent is preferable to control the reaction between them under temperature control in mass mixing. If some of all the epoxy resin used in the final composition is mixed with the solid rubber, to prepare a masterbatch, and this is mixed with the remaining epoxy resin and other ingredients, then homogeneous mixing can be achieved.

When inorganic particles are added as an ingredient of the component [C], the amount is preferably 1 to 10 wt % based on the total weight of the resin composition. If the amount is less than 1 wt %, pits and resin blurs are likely to occur on the surfaces of the skin panels of the honeycomb structure, and pores are likely to be formed in the skin panels. On the other hand, if more than 10 wt %, the resin viscosity is so high as to be likely to make the impregnation into the prepreg difficult, and the self adhesiveness to the honeycomb core also declines. A more preferable range is 1 to 5 wt %. Either a solid rubber or inorganic particles can be used, but using them together is more preferable for decreasing the pits on the surface of the skin panel and the pores in the skin panel, improving the tackiness of the prepreg and maintaining the heat resistance of the fabricated product. In this case, the most preferable amounts are 2 to 4 wt % of a solid rubber and 1 to 4 wt % of inorganic particles.

The mixing of the inorganic particles and the epoxy resin can be achieved usually by roll kneading or kneader kneading. It is preferable for achieving homogeneous mixing that some of all the epoxy resin used in the final composition is mixed with inorganic particles, to prepare a masterbatch, and then that the masterbatch is mixed with the remaining epoxy resin and other ingredients. However, when the composition as a whole is high in viscosity like a solid rubber-added epoxy resin, direct mixing of inorganic particles not formed as a masterbatch is also preferable and can achieve practically sufficient mixing.

It is also preferable to add a thermoplastic elastomer as an ingredient of the component [C]. Especially a polyester based or polyamide based thermoplastic elastomer can be preferably used.

A polyester based or polyamide based thermoplastic elastomer is a block copolymer consisting of a hard segment and a soft segment, with a structure in which the hard segment is a polyester component or polyamide component, and has a glass transition temperature higher than room temperature and a melting point higher than room temperature. The thermoplastic elastomers which can be used here are stated, for example, in International Application WO 096/02592.

Furthermore, many marketed products can also be used. Marketed polyester based thermoplastic elastomers include "Hitrel" produced by Toray Du Pont, "Pelprene" produced by Toyobo, "Arnitel" produced by Aczo and "Lomond" produced by General Electrics. Marketed polyarnide based thermoplastic elastomers include "Vestamid" produced by Huels, "Pebax" produced by Atochem, "Grilax A" produced by EMS, "Novamid" produced by Mitsubishi Kasei, etc.

An epoxy resin composition containing any of the above mentioned polyester based or polyamide based thermoplastic elastomers is excellent in tackiness, low in viscosity and also excellent in drapability and impregnability into the reinforcing fibers. Furthermore, as compared with an epoxy resin composition not containing such a thermoplastic elastomer, since the dependency of the viscoelasticity function of the resin on temperature, particularly the change at about room temperature, is small, the dependency of prepreg handling convenience on temperature is preferably small. Therefore, the prepreg obtained by using the epoxy resin composition can manifest excellent properties in tackiness, drapability and grade. To obtain such an effect, it is preferable to add in an amount of 1 to 20 weight parts of a polyester based or polyamide based elastomer against 100 weight parts of the epoxy resin. The melting point of the polyester based or polyamide based thermoplastic elastomer is preferably 100° C. or higher, more preferably 140° C. or higher, since it affects the heat resistance of the cured epoxy resin composition.

In a comparison between a polyester based thermoplastic elastomer and a polyamide based thermoplastic elastomer, the latter is preferable since physical properties of the fiber reinforced composite material such as inter-layer shear strength, 90° tensile strength and 0° compressive strength are higher.

To obtain a composite material with excellent physical properties such as mechanical properties while the epoxy resin composition containing a polyester based or polyamide based thermoplastic elastomer maintains excellent tackiness, it is effective to add a thermoplastic resin thermodynamically soluble in the epoxy resin, particularly a thermoplastic resin with hydrogen bondable functional groups. The reason is considered to be that the adhesiveness between the matrix resin and the reinforcing fibers is improved.

A plurality of these polyester based thermoplastic elastomers and polyamide based thermoplastic elastomers can also be used in combination.

An epoxy resin containing a thermoplastic elastomer can be prepared, for example, by adding an elastomer to a heated epoxy resin, mixing to form a homogeneous solution, lowering the temperature so as not to cause curing reaction, and adding a curing agent and, as required, a curing accelerator. Therefore, the polyester based or polyamide based thermoplastic elastomer used is preferably thermodynamically soluble in the epoxy resin at high temperature at least when it is added and mixed. Furthermore, if the soluble elastomer is remarkably low in solubility, a sufficient effect in enhancing tackiness cannot be obtained. Thus, it is preferable that the elastomer has a solubility higher than a certain level.

It is also preferable to add a publicly known thermoplastic resin as an ingredient of the component [C], such as polysulfone, polyether sulfone, polyether imide, polyvinyl formal, polyvinyl butyral, polyethylene oxide, copolymerized nylon, etc.

The epoxy resin composition of the present invention can contain such additives as a high polymer other than those listed above, reactive diluent, chain extender, antioxidant and organic particles, in addition to the above additives, as ingredients of the component [C].

As the high polymer, a high polymer soluble in the epoxy resin can be added for any of various purposes. Specifically, a reactive silicone as stated in European Patent No. 475611 (corresponding to JP-A-6-93103) is preferable since it improves the toughness and ductility of the cured resin and is effective to adjust the flowability of the uncured resin.

As the reactive diluent, a monofunctional epoxy compound can be preferably used. It can be selected, for example, from butylglycidyl ether, 2-ethylhexylglycidyl ether, phenylglycidyl ether, cresylglycidyl ether, p-sec-butylglycidyl ether, p-tert-butylglycidyl ether, etc.

As the chain extender, a bisphenol can be preferably used. It can be selected, for example, from bisphenol A, bisphenol S, fluorenebisphenol, etc.

As the antioxidant, a phenol based antioxidant such as 2,6-di-tert-butyl-p-cresol (BHT), butylated hydroxyanisole or tocophenol or a sulfur based antioxidant such as dilauryl 3,3'-thiodipropionate or distearyl 3,3'-thiodipropionate can be preferably used.

As the organic particles, fine particles of a thermoplastic resin, thermosetting resin or elastomer, etc. can be used. As the thermoplastic resin, particles of a polyamide resin can be used. As the thermosetting resin, particles of a cured epoxy resin or phenol resin can be used. As the elastomer, crosslinked rubber particles, and core/shell type rubber particles in which an elastomer such as a butyl acrylate copolymer is covered with a non-elastomeric high polymer such as polymethyl acrylate can be used. The use of these organic particles is preferable mainly for improving toughness and improving the self adhesiveness to the honeycomb core.

The core/shell polymer is usually spherical fine particles consisting of a core phase and a shell phase. A core/shell polymer with a double structure consisting of a core and a shell, a multi-core/shell polymer with a multiple structure consisting of a soft core, hard shell, soft shell and hard shell, etc. are known. Among them, a core/shell polymer with a structure consisting of a soft core made of an elastomer based material and a hard shell formed by covering the core with a shell ingredient and polymerizing it can be preferably used since it can be well dispersed into an epoxy resin, as compared with other structures. Materials used as cores include, for example, polybutadiene, polyacrylates, polymethacrylates, polybutyl acrylate, styrene-butadiene polymer, ethylene-propylene polymer, etc. Materials used as shells include, for example, polystyrene, polyacrylonitrile, polyacrylates, polymethacrylates, polymethyl methacrylate, etc. The properties can be changed by changing the copolymerization ratio, and a core/shell polymer with a rubber phase can be said to be a solid rubber.

The core/shell polymer must be 10 to 90 wt % in core content and 90 to 10 wt % in shell content. If the core content is less than 10 wt %, a sufficient high strength effect cannot be obtained. If more than 90 wt %, the cores cannot be perfectly covered with shells, and when it is mixed with the epoxy resin, the resin viscosity increases with the lapse of time, and the composite material becomes diverse in physical properties.

The core/shell type rubber particles can be produced by the methods disclosed in U.S. Pat. No. 4,419,496, European Patent No. 45,357 and JJP-A-Open (Kokai) No. 55-94917. Marketed products can also be used. Marketed core/shell polymers include, for example, Paraloid EXL2655 (produced by Kureha Chemical Industry Co., Ltd.), TR-2122 (produced by Takeda Chemical Industries, Ltd.), EXL2611, EXL-3387 (produced by Rohm & Haas), etc. The particle size of the core/shell polymer is preferably 5 $\mu$m or less, more preferably 1 $\mu$m or less. It is unprferable that the particle size is larger than 10 $\mu$m, because, when the reinforcing fibers are impregnated with the matrix resin, the particles are not homogeneously dispersed, to form a heterogeneous product. Especially it is preferable that the particle size is 1 $\mu$m or less, because, even when the composite material is as high as more than 50 vol % in the reinforcing fiber content, the fiber orientation is not disturbed and the effect of improving the self adhesiveness to the honeycomb core is remarkable. A suitable amount of the core/shell type particles added is 1 to 15 weight parts against 100 weight parts of the epoxy resin. If the amount is less than 1 weight part, the effect of improving toughness and self adhesiveness is small, and if more than 15 weight parts, the viscosity of the resin composition becomes high, making it difficult to impregnate the reinforcing fibers. A preferable range is 3 to 10 weight parts.

It is preferable for achieving homogeneous mixing that some of all the epoxy resin used in the final composition is mixed with the core/shell rubber particles under heating, to prepare a masterbatch, and then that the masterbatch is mixed with the remaining epoxy resin and other ingredients. However, when the viscosity of the composition as a whole is high like solid acrylonitrile butadiene rubber-added epoxy resin, even direct mixing of core/shell rubber particles not formed as a masterbatch can achieve practically sufficient mixing preferably since the shear force at the time of mixing is high.

When the core/shell type particles are added, if the following epoxy resin composition is used, the self adhesiveness to the honeycomb core can be remarkably improved. At least the epoxy resins are selected from the following ranges:

| | |
|---|---|
| Bisphenol type epoxy resin | 50~80% |
| Novolak type epoxy resin | 0~20% |
| Tetraglycidyl diaminodiphenylmethane | 5~40% |

The prepreg of the present invention includes also the following constitution; i.e., a prepreg consisting of said resin composition and reinforcing fibers [D].

As the reinforcing fibers [D], glass fibers, carbon fibers, aramid fibers, boron fibers, alumina fibers, silicon carbide fibers, etc. can be used. Two or more kinds of these fibers can be used as a mixture. To obtain a fabricated product lighter in weight and higher in durability, the use of carbon fibers is especially preferable. In view of the tensile strength peculiar to the fibers and the high impact resistance as a honeycomb structure, high strength carbon fibers of 4.4 GPa or more in strand tensile strength and 1.7% or more in tensile breaking elongation are more preferable. The strand tensile strength in this case is measured according to JIS R 7601. Furthermore, in view of higher impact resistance, carbon fibers of 1.7% or more in tensile elongation are especially preferable, and it is preferable that the tensile elastic modulus E is 2000 GPa or more and that the breaking strain energy is 4.0 mm-kgf/mm$^3$ or more. The breaking strain energy is calculated from $W=\sigma^2/2E$ where $\sigma$ is the tensile strength (kgf/mm$^2$) measured according to JIS R 7601 and E is the elastic modulus. Such high strength high elongation carbon fibers include, for example, T700SC, T800H, T1000G, etc. produced by Toray Industries, Inc.

The reinforcing fibers are not limited in form or arrangement, and for example, long fibers paralleled in one direction, tows, woven fabric (cloth), mat, knitted fabric, braid, etc. can be used.

When fibers laid parallel in one direction are used, a narrow slit tape prepreg, or a strand prepreg or yarn prepreg obtained by impregnating a strand unwound from a bobbin with a resin is also preferable, in addition to a wide prepreg. However, in view of the mechanical properties of the honeycomb structure and the ease of the fabricating process, a prepreg formed as a woven fabric is most preferable.

As a woven fabric of reinforcing fibers, a conventional two-dimensional woven fabric can be used. As for the weave, a biaxially woven fabric in which warp and weft are crossed at right angles according to a certain rule, such as plain weave, twill weave or satin weave is preferable. Especially plain wave is suitable since it allows easy formation of a thin fabricated product. The weaving yarns of a woven fabric are fiber bundles, and it is preferable that one fiber bundle consists of 2500 to 25000 filaments. If the number of filaments is less than 2500, arranged fibers are likely to meander and to cause decline of strength. If more than 25000, at the time of prepreg production or fabricating, resin impregnation is unlikely to occur, and pores are likely to be formed. A more preferable range is 2800 to 15000 filaments. Especially a fiber bundle of more than 6000 filaments is preferable in view of higher surface smoothness of the honeycomb skin panel. Similarly, the fineness of a fiber bundle is preferably 1500 to 20000 deniers. If the fineness is less than 1500 deniers, the arranged fibers are likely to meander, and if more than 20000 deniers, resin impregnation is unlikely to occur at the time of prepreg production or fabricating.

If a woven fabric in which substantially twistless flat carbon fiber multifilament yarns respectively consisting of many carbon fibers are used as warp and/or weft threads, the fibers of the woven fabric move less and sinking of surface resin is unlikely to occur even if the woven fabric prepreg is allowed to stand for a long time. Thus, the temporal change of tackiness of the prepreg can be inhibited. Furthermore, also during fabrication, the fibers of the woven fabric prepreg move less, and sinking of surface resin is unlikely to occur. Thus, the surface smoothness of the cured honeycomb skin panel is improved. The term "substantially twistless" means a state where the yarn is not twisted by one turn or more per 1 m. A woven fabric formed by using substantially twistless multifilament yarns of 80 to 1000 mm, preferably 100 to 500 mm in integrity in terms of hook drop value keeps the fibers less movable, is likely to keep the weaving yarns flat, and improves the temporal change of tackiness of the prepreg and the surface smoothness of the honeycomb skin panel.

The hook drop value in this case is the value obtained by vertically suspending a carbon fiber bundle in an atmosphere of 23° C. and 60% humidity, hooking the top hook of a stainless steel wire of 1 mm in diameter and about 100 mm in length bent at top and bottom 20 to 30 mm portions, to the fiber bundle, with the bottom hook loaded with a weight of 12 g, and measuring the descending distance of the weight 30 minutes later. If the fiber bundle is twisted, this value is smaller. In the case of a reinforcing woven fabric of carbon fibers, the filaments of a fiber bundle as a precursor are entangled with each other to keep the carbon fiber yarn integral for preventing the problem that filaments broken during production are caught around rollers. Furthermore, the deposition of a sizing agent or the mutual bonding of filaments is used for keeping the carbon fiber yarn integral. The integrity can be controlled by adjusting the mutual entangling degree of filaments, the deposition of a sizing agent and bonding. If the hook drop value is less than 80 mm to show excessively intensive integrity, it is difficult to enlarge the cover factor of the woven fabric or the cover factor of the prepreg described later. Furthermore, the impregnability of the prepreg is likely to be poor. As a result, surface pits and internal voids are likely to occur in the skin panel. If the hook drop value is 1000 mm or more, the integrity of the carbon fiber yarn becomes poor, and since fluff is likely to be generated, the weavability becomes low. Furthermore, the strength as a composite material declines. A woven fabric of flat carbon fiber multifilament yarns of 0.05 to 0.2 mm in yarn thickness, 30 or more in yarn width/yarn thickness ratio and 100 to 320 g/m$^2$ in weight of the woven fabric keeps crimps small, has small movement of fibers and small movement of the resin in the prepreg impregnated with the resin, inhibits the temporal change of tackiness of the prepreg and improves the surface smoothness of the honeycomb skin panel. If these flat weaving yarns are used, the woven fabric obtained is higher in fiber density than ordinary woven fabrics, and a prepreg less in the temporal change of tackiness can be easily obtained. The surface smoothness of the honeycomb skin panel is also improved. If the thickness of the woven fabric prepreg is 0.15 to 0.35 mm, the roughness based on bent weaving yarns is not so conspicuous, and the surface smoothness of the honeycomb skin panel is also improved.

A woven fabric made of such flat carbon fiber multifilament yarns can be produced according to the method described in JP-A-7-300739.

In the present invention, the resin content of the prepreg is preferably 33 to 50 wt %. If the resin content is less than 33 wt %, the tackiness of the prepreg is likely to be insufficient, and surface pits, resin blurs and pores in the skin panel are likely to be generated. If the resin content is more than 50 wt %, tackiness is likely to be excessive, and there is a possibility that resin flow occurs when the prepreg is produced. Furthermore, since the weight of the fabricated product increases, the advantage of weight reduction diminishes. An especially preferable resin content range is 35 to 45 wt %.

In a woven fabric prepreg consisting of the above components, it is preferable that the weave meshes formed as clearances between warp and between weft are closed. In the case of cloth prepreg of 96% or more in cover factor, a fabricated honeycomb panel especially good in surface smoothness and free from internal pores can be easily obtained, and if the cover factor is insufficient, surface pits and internal pores are likely to be generated in the honeycomb panel. If the cover factor is large, a cloth prepreg which gives a fabricated panel excellent in burn through characteristic can be obtained. However, if the cover factor exceeds 99.9%, the drapability, important in a prepreg, is impaired. Therefore, the cover factor Kp suitable for the present invention is 96 to 99.9%, preferably 97.5 to 99.9%.

The cover factor is preferably measured as described below. At first, a stereoscopic microscope, for example, stereoscopic microscope SMZ-10-1 produced by Nikon Corp. is used, to photograph the surface of a prepreg while light is applied from the back side of the prepreg. Thus, a light transmitted pattern of the woven fabric black in the yarn portions and white in the weave mesh portions is photographed. The quantity of light is set in a range not causing halation. In the present invention, the light of Double Arm Fiber produced by Nikon Corp. was reflected by an acrylic sheet. The photographing magnification is set within 10 times so that respectively 2 to 20 warp and weft may be contained in the analysis range in the later image analysis. Then, the photograph obtained is photographed by a CCD (charge coupled device) camera, to convert the photographed image into digital data expressing white and black, and the digital data are stored in a memory, and analyzed by an image processor, to calculate the cover factor ($C_g$) from the following formula:

$$C_f = [(S_1 - S_2)/S_1] \times 100$$

where $S_1$ is the entire area and $S_2$ is the area of white portions (weave mesh portions). A similar operation is performed at 10 places of the same woven fabric, and its simple mean is adopted as the cover factor.

In the present invention, as the CCD camera and image processor, Personal Image Analyzing System LA-525 produced by K.K. Pias was used. The analysis range of an image was from the left edge of the warp located at the leftmost position in the photograph to the left edge of the warp located at the rightmost position in the photograph in the horizontal direction, and from the top edge of the weft located at the topmost position in the photograph to the top edge of the weft located at the bottommost position in the photograph in the vertical direction, and respectively 2 to 20 warp and weft were arranged to be contained in this range. The digital data contain intermediate portions between black and white at the borders between weaving yarn portions (black portions) and weave mesh portions (white portions). A threshold value to distinguish the intermediate portions into yarn portions and weave mesh portions, must be set. For this purpose, a lattice with an actual cover factor of 75% was made as a model, and the image analyzing system was standardized to recognize the lattice accurately to have a cover factor of 75%. That is, a 6 mm wide black tape was stuck onto transparent paper lengthwise and crosswise in lattice, to make a model with a cover factor of 75%, and with the stop of the CCD camera set at 2.8, the image analyzing system LA-525 was standardized to recognize portions of 128 or less in stored value as yarn portions (in this system, the contrast of white and black is stored as values of 0 to 255 steps).

That the cover factor Kc of a woven fabric is 92 to 99.5% is preferable since the cover factor Kp of the prepreg pressurized at the time of prepreg production can be easily adjusted to be in a range of 96 to 99.9%.

Prepreg production methods include, a wet method in which the matrix resin is dissolved in a solvent, to be lowered in viscosity for impregnation, a hot melt method (dry method) in which the matrix resin is heated to be lowered in viscosity for impregnation, and so on. In the hot melt method, the reinforcing fibers are overlapped on both sides or one side of a film such as releasing paper coated with the epoxy resin composition, and the laminate is heated and pressurized for impregnation with the resin, to prepare a prepreg. This method is preferable since the resin content and the prepreg thickness can be easily controlled.

For fabricating the prepreg of the present invention, vacuum bag fabricating, autoclave fabricating using a vacuum bag, press fabricating, etc. can be used. For obtaining a high performance honeycomb structure, autoclave fabricating is preferable.

As the honeycomb core, a Nomex honeycomb core made of aramid paper impregnated with phenol resin is especially preferable, since a light-weight high-strength structure can be formed. The cell size is generally 3 to 19 mm. In addition, an aluminum honeycomb, GFRP honeycomb, graphite honeycomb, etc. can also be used.

In the present invention, the modulus of storage rigidity G' of a resin composition was measured using Model RDA-II instrument produced by Rheometrics under the following conditions:

Operation mode: Dynamic mode
Vibration frequency: 0.5 Hz
Plates: Parallel discs (25 mm in radius) Gap 0.83 mm
Measuring temperature range: 50~150° C.
Heating rate: 1.5° C./min
Strain: Automatically controlled to keep the torque in a range of 2 to 200 g·cm.

The thixotropy index and resin viscosity of an epoxy resin composition were measured also using Model RDA-II instrument produced by Rheometrics under the following conditions:

(Thixotropy measuring conditions)
Operation mode: Dynamic mode
Vibration frequency range: 0.01 Hz~1.0 Hz
Plates: Parallel discs (25 mm in radius) Gap 0.83 mm
Measuring temperature (resin temperature): 70° C.
Strain: 100%
(Resin viscosity measuring conditions)
Operation mode: Dynamic mode
Vibration frequency: 0.5 Hz
Plates: Parallel discs (25 mm in radius) Gap 0.83 mm
Measuring temperature range: 50~150° C.
Heating rate: 1.5° C./min
Strain: Automatically controlled to keep the torque in a range of 2 to 200 g·m.

As indicators of the self adhesiveness between a honeycomb core and a skin panel, flatwise tensile strength (FWT) and climbing drum peel strength (CDP) were used. The honeycomb core used for these tests was Nomex Honeycomb SAH1/8–8.9 (SAH1/8–8.0, 12.7 mm in thickness, produced by Showa Hikoki K.K). The lamination of a woven fabric prepreg adopted was a symmetrical lamination of two plies of (±45°)/(0°/90°) each on both the top and bottom of the honeycomb core (the outermost layers were of ±45°). For curing, the sample was heated at 1.5° C./min up to 180° C., and held at the same temperature for 2 hours in an autoclave. In this case, at first, a nylon bag was placed to cover the laminate on an aluminum tool sheet, and they were inserted into the autoclave with the bag kept internally in vacuum. Then, when a pressure of 1.5 kg/cm$^2$ was applied, the vacuum in the bag was returned to atmospheric pressure, and subsequently the pressure was raised to 3 kg/cm$^2$, followed by heating.

The porosity in a skin panel was determined by area measurement. On the top of the honeycomb core, woven fabric prepreg layers were laminated in (±45°)/(0°/90°)/(0°/90°)/(0°/90°) from above, and on the bottom of the honeycomb core, woven fabric prepreg layers were laminated in (0°/90°)/(0°/90°)/(±45°), and the prepreg layers were self-bonded to the honeycomb core and cured. A section of the fabricated product thus obtained was photographed using a microscope at a magnification of 25 times. A fabricated honeycomb product of about 26 cm in length and about 19 cm in width was cut in the transverse direction, and the value obtained by dividing the pore area in the bottom skin panel section by the sectional area of the skin panel was adopted as the porosity. In this case, a 25.4 mm long range where the porosity was most in all the section-observed field was selected, to calculate the pore area.

The surface smoothness was evaluated using a surface roughness tester by fabricating honeycomb skin panels as described below. At first, prepreg layers were laminated on both sides of a honeycomb core (SAH1/8–8.0, 12.7 mm in thickness, produced by Showa Hikoki K.K.) in two plies of (0°/90°)/(±45°) (with ±45° as the outermost layer) per side to be symmetric relative to a plane. The prepreg was cured under the above mentioned curing conditions, while being self-bonded to the honeycomb core. The surface roughness of the honeycomb skin panel on the tool sheet side was determined by Surface Roughness Tester Surftest 301 produced by Mitsutoyo K.K. A length of 8 mm was evaluated by a probe, and the difference between the average height of the five highest points and the average height of the five lowest points within the length was obtained. This was executed five times, and the average value was obtained.

For evaluation of impact resistance, the same lamination structure as adopted for the above mentioned honeycomb sandwich panel for evaluation of self adhesiveness was used. Dynatap 8250 was used, and a 11.3 kg weight was dropped from a height of 80 cm to examine the damage.

To evaluate the tackiness of a prepreg, prepreg layers were bonded by pressure, and the peeling force was measured. This measuring method includes many parameters such as load stress, speed and time. These can be properly decided, considering how the prepreg is used, etc. For evaluation of tackiness in the examples, "Instron" 4210 Universal Testing Machine (produced by Instron Japan K.K.) was used as a measuring instrument for measurement under the following conditions:

Sample; 50×50 mm
Loading speed: 1 mm/min.
Bonding load: 0.12 MPa
Loading time: 5±2 sec
Peeling speed: 10 mm/min
Environment: 25° C., 50% relative humidity The drapability of a prepreg was evaluated by measuring the flexural elastic modulus of the prepreg. The flexural elastic modulus was measured approximately according to JIS K 7074 "Bending Test Methods for Fiber Reinforced Plastics". However, since a prepreg is usually very thin, the conditions must be set properly. In the examples of the present invention, "Instron" 4201 Universal Testing Machine (produced by Instron Japan K.K.) was used as a measuring instrument for measurement under the following conditions:

Sample: 85 mm (weft direction)×15 mm (weft direction)
Loading speed: 5 mm/min
Span length: 40 mm (L/D=40/0.06)
Indenter diameter: 4 mm
Environment: 25° C., 50% relative humidity The present invention can provide a prepreg excellent in self adhesiveness to the honeycomb, having a high skin panel peeling strength when fabricated as a honeycomb sandwich panel, low in the porosity inside the skin panel, low in the porosity and pit formation on the sauce, excellent in surface smoothness, appropriate in tackiness and drapability and excellent in storage stability. The present invention also can provide its matrix resin composition. The honeycomb sandwich panel obtained is excellent in impact resistance and hot water resistance.

The present invention is described below in detail in reference to examples.

EXAMPLE 1

Fifty weight parts of bisphenol A type liquid epoxy resin (Ep828 produced by Yuka Shell Epoxy K.K.), 30 weight parts of cresol novolak type solid epoxy resin (ESCN220 produced by Sumitomo Chemical Co., Ltd.) and 4 weight parts of carboxyl group-containing solid acrylonitrile butadiene rubber (NIPOL1072 produced by Nippon Zeon Co., Ltd.) were kneaded by a kneader at 80° C. for preliminary reaction for 3 hours. The reaction mixture was cooled to 60° C., and 20 parts of tetraglycidyl diaminodiphenylmethane (ELM434 produced by Sumitomo Chemical Co., Ltd.) and 3 parts of fine silica particles treated on their surfaces by trimethylsilyl groups (Aerosil R812 produced by Degusa) were added, and the mixture was kneaded for preliminary reaction for 1 hour. As a curing agent, 40 weight parts of 4,4'-aminodiphenylsulfone were added, and the mixture was stirred at 60° C. for 30 minutes, to produce an epoxy resin composition. The modulus of storage rigidity G' of the resin composition was measured by parallel plates of 0.5 Hz, and the minimum value in a temperature range of 70° C. to 100° C. was found to be 11 Pa at 95° C., while the maximum value was found to be 34 Pa at 70° C. log 10 (G' max/G' min) was 0.49. Even in a wider temperature range of 70° C. to 130° C., the minimum and maximum values of G' were the same. The thixotropy index of the epoxy resin composition at 70° C. was 13. The viscosity of the epoxy resin composition was measured and the viscosity at 80° C. was found to be 200 poises, while the minimum viscosity was 90 poises. The resin composition was cured at 180° C. for 2 hours, and the Tg the resin was found to be 216° C.

Releasing paper was coated with the resin composition at 65° C., to produce a resin film of 66 g/m$^2$ in weight of resin. The resin film was set in a prepreg machine, and a carbon fiber plain weave fabric (190 g/m$^2$ in weight and 98.7% in cover factor Kc of woven fabric) produced by Toray Industries, Inc. formed by carbon fibers T700SC-12K (12000 fibers, 7200 deniers in fineness, 254 mm in hook drop value) of 4.9 GPa in strand tensile s o 2.3 GP in tensile elastic modulus and 2.1% in tensile breaking elongation was impregnated on both sides with the resin, to obtain a prepreg. The impregnation temperature was 100° C. The cover factor Kp of the produced prepreg was 99.6%.

A laminate of a honeycomb core and the prepreg was placed on an aluminum sheet with a fluorine resin film laid on it, and the laminate was vacuum-packed by a nylon film, and fabricated in an autoclave. No adhesive film was held between the prepreg and the honeycomb core, and the prepreg was cured to be directly bonded to the honeycomb core. The flatwise tensile strength of the honeycomb sandwich panel thus obtained was measured and found to be 3.76 MPa. Furthermore, according to ASTM D 1781, a climbing drum peel test was conducted, and a peel strength of 16.2 pound inches/3 inch width was shown.

To obtain the porosity of the bottom skin panel, a cross section of the sandwich panel was polished by sand paper and alumina powder, and photographed by an optical microscope. From the photograph, the porosity was found to be 0.1%. The surface roughness of the honeycomb sandwich panel on the tool face side was measured and found to be as excellent as 5.6 μm.

The tackiness of the prepreg before lamination fabricating was measured and found to be 0.15 MPa. The drapability was evaluated and found to be as moderate as 3.1 GPa. The prepreg was allowed to stand in an environment of 25° C. 50% relative humidity for 10 days, and the tackiness was found to be 0.11 MPa.

Comparative Example 1

A resin composition was produced as described in Example 1, except that fine silica-particles were not added. The modulus of storage rigidity G' of the resin composition was measured by parallel plates of 0.5 Hz, and the minimum value in a temperature range of 70° C. to 100° C. was found to be as low as 2.4 Pa at 100° C., while the maximum value was found to be 28 Pa at 70° C. log 10(G' max/G' min) was as large as 1.07. The minimum value in a range of 70° C. to 130° C. was 1.2 Pa at 115° C., and the maximum value was 28 Pa at 70° C.

Subsequently a prepreg was obtained as described in Example 1. The cover factor Kp of the prepreg was 97.9%. The tackiness of the prepreg was measured and found to be 0.17 MPa. Furthermore, the drapability was evaluated and found to be 2.7 HPa. The prepreg was allowed to stand in an environment of 25° C. 50% relative humidity for 10 days, and the tackiness was found to have greatly declined to 0.03 MPa.

The flatwise tensile strength of the honeycomb sandwich panel obtained as described in Example 1 was measured and found to be 1.73 MPa. Moreover, according to ASTM D 1781, a climbing drum peel test was conducted, and a peel strength of 8.5 pound inches/3 inch width was shown.

To obtain the porosity in the bottom skin panel, a cross section of the sandwich panel was polished by sand paper and alumina powder, and photographed using an optical microscope. From the photograph, the porosity was found to be 1.5%. The surface smoothness of the honeycomb sandwich panel was measured and found to be as insufficient as 35.3 μm.

Comparative Example 2

Thirty weight parts of cresol novolak type solid epoxy resin (ESCN220 produced by Sumitomo Chemical Co., Ltd.) and 8.5 weight parts of carboxyl group-containg solid acylonitrile butadiene rubber (NIPOL1072 produced by Nippon Zeon Co., Ltd.) were kneaded by a kneader at 40 to 50° C. for 1 hour. At this temperature, the preliminary reaction between carboxyl groups and epoxy groups was insufficient. In this state, 50 weight parts of bisphenol A type liquid epoxy resin (Ep828 produced by Yuka Shell Epoxy K.K.) and 20 weight parts of tetraglycidyl diaminodiphenylmethane (ELM434 produced by Sumitomo Chemical Co., Ltd.) were added, and the mixture was kneaded at 60° C. for 1 hour. Furthermore, as a curing agent, 40 weight parts of 4,4'-diaminodiphenylsufone were added, and the mixture was stirred at 60° C. for 30 minutes, to produce an epoxy resin composition. The modulus of storage rigidity G' of this resin composition was measured by parallel plates of 0.5 Hz, and the minimum value in a temperature range of 70° C. to 100° C. was found to be 10 Pa at 100° C. while the maximum was found to be 220 Pa at 70° C. log 10 (G' max/G' min) was 1.35. The minimum value in a temperature range of 70° C. to 130° C. was 3.9 Pa at 115° C., and the maximum value was 220 Pa at 70° C.

The resin composition was used to obtain a prepreg as describe in Example 1. However, since the resin viscosity was high, the resin coating was executed at 75° C. In spite of the temperature, it was difficult to produce a film, and some portions were short of the resin. The area free from the portions short of the resin was used to produce a prepreg. The cover factor Kp of the prepreg was 98.1%. The tackiness of the prepreg was measured and found to be 0.18 MPa. Furthermore, the drapability was evaluated, and found to be 3.1 GPa. The prepreg was allowed to stand in an environment of 25° C. 50% relative humidity for 10 days, and the tackiness was found to have greatly declined to 0.04 MPa. The flatwise tensile strength of the honeycomb sandwich panel obtained as described in Example 1 was measured and found to be 0.83 MPa. Moreover, according to ASTM D 1781, a climbing drum peel test was conducted, and a peel strength of 7.1 pound inches/3 inch width was shown.

To obtain the porosity in the bottom skin panel, a cross section of the sandwich panel was polished by sand paper and alumina powder, and photographed using an optical microscope. From the photograph, the porosity was found to be 0.4%. The surface smoothness of the honeycomb sandwich panel was measured and found to be as insufficient as 25.1 μm.

EXAMPLE 2

Forty weight parts of bisphenol F type liquid epoxy resin (Epc830 produced by Dainippon Ink & Chemicals, Inc.), 30 weight parts of brominated bisphenol A type solid epoxy resin (Epc152 produced by Dainippon Ink & Chemicals, Inc.) and 5 weight parts of carboxyl group-containing solid acrylonitrile butadiene rubber (NIPOL1472HV produced by Zeon Chemical) were kneaded by a kneader at 80° C. for preliminary reaction for 3 hours. The reaction mixture was cooled to 60° C., and 30 weight parts of tetraglycidyl diamodiphenylmethane (ELM434 produced by Sumitomo Chemical Co., Ltd.) and 4 weight parts of fine silica particles treated on their surfaces by dimethylsilicone groups (Aerosil RY200 produced by Nippon Aerosil) were added, and the mixture was kneaded for preliminary reaction for 1 hour. In this state, 40 parts of 4,4'-aminodiphenylsulfone were added, and the mixture was stirred at 60° C. for 30 minutes, to produce an epoxy resin composition. The modulus of storage rigidity G' of the resin composition was measured by parallel plates of 0.5 Hz, and the minimum value in a temperature range of 70° C. to 100° C. was found to be 80 Pa at 95° C. while the maximum value was found to be 120

Pa at 70° C. log 10 (G' max/G' min) was 0.17. Furthermore, the minimum and maximum values in a temperature range of 70° C. to 130° C. were the same. The thixotropy index of the epoxy resin composition at 70° C. was 10. The viscosity of the epoxy resin composition was measured, and the viscosity at 80° C. was found to be 300 poises, while the minimum viscosity was found to be 70poises. The resin composition was cured at 180° C. for 2 hours, and the Tg of the resin was 208° C.

Releasing paper was coated with the resin composition at 70° C., to produce a resin film of 66 gm/$^2$ in weight of resin. The resin film was set in a prepreg machine, and a carbon fiber plain weave fabric (190 g/m$^2$ in weight) produced by Toray Industries, Inc. formed by carbon fibers T700S-12K of 4.9 GPa in strand tensile strength was impregnated on both sides with the resin, to obtain a prepreg. The impregnation temperature was 100° C. The cover factor Kp of the prepreg was 99.6%.

As described in Example 1, the flatwise tensile strength of the honeycomb sandwich panel was measured and found to be 3.72 MPa. According to ASTM D 1781, a climbing drum peel test was conducted, and a peel strength of 14.3 pound inches/3 inch width was shown. The porosity in the bottom skin panel was 0.2%. The surface smoothness of the honeycomb sandwich panel was measured. and found to be as excellent as 9.7 μm.

The tackiness of the prepreg before lamination fabricating was measured and found to be 0.14 MPa. Furthermore, drapability was evaluated and found to be. as moderate as 2.9 GPa. The prepreg was allowed to stand in an environment of 25 ° C. 50 relative humidity for 10 days, and the tackiness was found to be 0.10 MPa.

Comparative Example 3

A resin composition was obtained as described in Example 2, except that 0.8 weight part of fine silica particles Aerosil RY200 and 2.7 weight parts of solid rubber NIPOL1472HV were used. The modulus of storage rigidity G' of the resin composition was measured by parallel plates of 0.5 Hz, and the minimum value in a temperature range of 70° C. to 100° C. was found to be 2.4 Pa at 100° C. while the maximum value was found to be 30 Pa at 70° C. log 10 (G' max/G' min) was 1.10. Furthermore, the minimum value in a temperature range of 70° C. to 130° C. was 1.9 Pa at 110° C., and the maximum value was 30 Pa at 70° C. The thixotropy index of the epoxy resin at 70° C. was 2.2. Moreover, the viscosity of the epoxy resin composition was measured and the viscosity at 80° C. was found to be 240 poises while the minimum viscosity was 15 poises. The resin composition was cured at 180° C. for 2 hours, and the Tg of the resin was found to be 218° C.

Then, as described in Example 2, a prepreg was obtained. The cover factor Kp of the prepreg was 99.0%. The tackiness of the prepreg was measured and found to be 0.15 MPa. The drapability was evaluated and found to be 2.8 GPa. The prepreg was allowed to stand in an environment of 25° C. 50% relative humidity for 10 days, and the tackiness was found to have greatly declined to 0.04 MPa.

The flatwise tensile strength of the honeycomb sandwich panel obtained. as described in Example 2 was measured and found to be 1.52 MPa. Furthermore, according to ASTM D 1781, a climbing drum peel test was conducted, and a peel strength of 6.5 pound inches/3 inch width was shown. The porosity in the bottom skin panel was 1.6%. The surface smoothness was measured and found be as insufficient as 32.9 μm.

Comparative Example 4

A resin composition was obtained as described in Example 1, except that liquid rubber CTBN1300 was used in an amount of 5 weight parts instead of the solid rubber. The modulus of storage rigidity G' of the resin composition was measured by parallel plates of 0.5. Hz, and the minimum value in a temperature range of 70° C. to 100° C. was found to be 1.1 Pa at 100° C. while the maximum value was 34 Pa at 70° C. log 10 (G' max/G' min) was 1.49. Furthermore, the minimum value in a temperature range of 70° C. to 130° C. was 0.8 Pa at 125° C. and the maximum value was 34 Pa at 70° C. The thixotropy index of the epoxy resin composition at 70° C. was 4.2. Furthermore, the viscosity of the epoxy resin composition was measured, and the viscosity at 80° C. was found to be 100 poises, while the minimum viscosity was found to 10 poises. The resin composition was cured at 180° C. for 2 hours, and the Tg of the resin was found to be 201° C.

Then, as described in Example 2, a prepreg was obtained. The cover factor of the prepreg was 98.6%. The tackiness of the prepreg was measured and found to be 0.11 MPa. The drapability was evaluated and found to be 2.7 GPa. The prepreg was allowed to stand in an environment of 25° C. 50% relatively humidity for 10 days, and the tackiness was found to have greatly declined to 0.01 MPa.

The flatwise tensile strength of the honeycomb sandwich panel obtained as described in Example 2 was measured and found to be 1.38 MPa. Furthermore, according to ASTM D 1781, a climbing drum peel test was conducted, and a peel strength of 3.9 pound inches/3 inch width was shown. The porosity in the bottom skin panel was 3.5%. The surface smoothness was measured and found to be as insufficient as 38.2 μm.

EXAMPLE 3

Twenty weight parts of bisphenol A type liquid epoxy resin (Ep828 produced by Yuka Shell Epoxy K.K.), 30 weight parts of cresol novolak type solid epoxy ESCN220 produced by Sumitomo Chemical Co., Ltd.) and 5 weight parts of carboxyl group-containing solid acrylonitrile butadiene rubber (NIPOL1702 produced by Nippon Zeon Co., Ltd.) were kneaded by a kneader at 40 to 50° C. for 1 hour. In this state, 30 weight parts of bisphenol A type liquid epoxy resin (Ep828 produced by Yuka Shell Epoxy K.K.), 20 weight parts of tetraglycidyl diaminodiphenylmethane (ELM434 produced by Sumitomo Chemical Co., Ltd.) and 5 weight parts of fine silica particles treated on their surfaces by trimethylsilyl groups (Aerosil R812 produced by Degusa) were added, and the mixture was kneaded at 60° C. for 1 hour. Furthermore as a curing agent, 40 parts of 4,4'-diaminodiphenylsulfone were added, and the mixture was stirred at 60° C. for 30 minutes, to produce an epoxy resin composition. The modulus of storage rigidity G' of the resin composition was measured by parallel plates of 0.5 Hz and the minimum value in a temperature range of 70° C. to 100° C. was found to be 10 Pa at 95° C. while the maximum value was found to be 45 Pa at 76° C. log 10 (G' max/G' min) was 0.65. Furthermore, even in a wider temperature range of 70° C. to 130° C., the minimum and maximum values of G' were the same. The thixotropy index of the epoxy resin composition at 70° C. was 15. Moreover, the viscosity of the epoxy resin composition was measured, and the viscosity at 80° C. was found to be 250 poises while the minimum viscosity was found to be 110 poises. The resin composition was cured at 180° C. for 2 hours, and the Tg of the resin was found to be 215° C.

Releasing paper was coated at 65° C. with the resin composition, to produce a resin film of 66 g/m² in weight of resin. The resin film was set in a prepreg machine, and a carbon fiber plain weave fabric (190 g/m² in weight and 98.7% in cover factor Kc of woven fabric) produce by Toray Industries, Inc. formed by carbon fibers T700SC-12K (12000 fibers, 7200 deniers in size) of 4.9 GPa in strand tensile strength, 2.3 GPa in tensile elastic modulus and 2.1% in tensile breaking elongation was impregnated on both sides with the resin, to obtain a prepreg. The impregnation temperature was 100° C. The cover factor Kp of the produced prepreg was 99.5%.

The flatwise tensile strength of the honeycomb sandwich panel was measured and found to be 3.59 MPa Furthermore, according to ASTM D 1781, a climbing drum peel test was conducted, and a peel strength of 14.5 pound inches/3 inch width was shown. The porosity in the bottom skin panel was 0.4%. The surface roughness on the tool face side was measured and found to be as good as 8.8 µm in smoothness.

The tackiness of the prepreg before-lamination fabricating was measured and found to be 0.14 MPa. Drapability was evaluated and found to be 3.8 GPa. The prepreg was allowed to stand in an environment of 25° C. 50% relative humidity for 10 days, and the tackiness was found to be 0.07 MPa.

EXAMPLE 4

A prepreg was obtained as described in Example 1, except that a carbon fiber woven fabric "Torayca" CO07373Z (193 g/m² in weight, 92.1% in cover factor Kc of woven fabric) produced by Toray Industries, Inc. formed by carbon fibers T3003K (94 mm in hook drop value) of 3.51 GPa in strand tensile strength was used as the carbon fiber woven fabric. The cover factor of the prepreg was 97.5%. The tackiness of the prepreg was measured and found to be 30.12 MPa, and the drapability was evaluated and found to be 3.8 GPa. The prepreg was allowed to stand in an environment of 25° C. 50 relative humidity for 10 days and the tackiness was found to be 0.07 MPa.

The flatwise tensile strength of the honeycomb sandwich panel was measured and found to be 3.46 MPa. According to ASTM D 1781, a climbing drum peel test was conducted, and a peel strength of 15.0 pound inches/3 inch width was shown. The porosity in the bottom skin panel was 0.2%. The surface roughness on the tool face side was measured and found to be 10.4 µm.

The impact resistance of the honeycomb sandwich panel was lower than that in Example 1. In the panel of Example 4, the weight passed through the panel to the back side, but in the case of the panel of Example 1, only the top skin was cracked.

EXAMPLE 5

Six weight parts of core shell rubber particles EXL-2655 were added to an epoxy resin composition consisting of 30 weight parts of tetraglycidyl diaminodiphenylmethane (ELM434 produced by Sumitomo Chemical Co., Ltd.), 45 weight parts of bisphenol A type epoxy resin (Ep828 produced by Yuka Shell Epoxy K.K.) and 25 weight parts of bisphenol A type epoxy resin (Ep1001 produced by Sumitomo Chemical Co., Ltd.). As additives, 3 weight parts of fine silica particles treated on their surface by trimethylsilyl groups (Aerosil R812 produced by Degusa) and 3.8 weight parts of carboxyl group-containing acrylonitrile butadiene rubber (NIPOL1472HV produced by Nippon Zeon Co., Ltd.) were added, and the mixture Was kneaded by a kneader. As a curing agent, 34 weight parts of 4,4'-diaminodiphenylsulfone were used. The modulus of storage rigidity G' of the resin composition was measured by parallel plates of 0.5 Hz, and the minimum value in a temperature range of 70° C. to 100° C. was found to be 12 Pa at 95° C., while the maximum value was 67 Pa at 70° C. log 10 (G' max/G' min) was 0.75. Furthermore, even in a wider temperature range of 70° C. to 130° C., the minimum and maximum values of G' were the same. The thixotropy index of the epoxy resin composition at 70° C. was 15.0. Moreover, the viscosity of the epoxy resin composition was measured, and the viscosity at 80° C. was found to be 380 poises and the minimum viscosity was 210 poises. The resin composition was cured at 180° C. for 2 hours, and the Tg of the resin was found to be 190° C.

From the epoxy resin composition, a prepreg and a honeycomb co-cured fabricated product were prepared. The flatwise tensile strength of the honeycomb sandwich panel was measured and found to be 3.89 MPa. According to ASTM D 1781, a climbing drum peel test was conducted, and a peel strength of 20.1 pound inches/³ inch width was shown. The porosity in the bottom skin panel was 0.1%. The surface roughness on the tool face side was measured and found to be as good as 7.4 µm in smoothness.

The tackiness of the prepreg before lamination fabricating was measured and found to be 0.12 MPa. The drapability was evaluated and found to be 3.2 GPa. The prepreg was allowed to stand in an environment of 25° C. 50% relative humidity for 10 days, and the tackiness was found to be 0.10 MPa.

The results of the above examples as well as Examples 6 to 9 including the coefficients of water absorption of CFRP and compressive strengths at 200F after water absorption are shown in Table 1.

Industrial Applicability

The prepreg of the present invention has good self adhesiveness to the honeycomb core and gives a fabricated product low in the porosity of the skin panels of the honeycomb structure. Furthermore, it is excellent in tackiness and small in the temporal change of tackiness, and when used as skin panels of the honeycomb structure, a molded product with less pits and dents on the skin panel surfaces can be given. Therefore, the fiber reinforced composite material of the present invention can be used widely for airplanes, automobiles and other industrial applications, particularly as structural materials for airplanes, because of its excellent mechanical properties.

TABLE 1

|  | Example | | | | |
|---|---|---|---|---|---|
|  | 1 | 2 | 3 | 4 | 5 |
| ENM 434 | 20 | 30 | 20 | 20 | 30 |
| Ep 828 | 50 |  |  | 50 | 45 |
| Epc 830 |  | 40 |  |  |  |
| Epc 152 |  | 30 |  |  |  |
| ESCN 220 | 30 |  | 30 | 30 |  |
| Ep 1001 |  |  |  |  | 25 |
| NIPOL1072 (solid rubber) | 4.0 |  | 5.0 | 4.0 |  |
| NIPOL1472HV (solid rubber) |  | 5.0 |  |  | 3.8 |
| HvcarCTBN 1300 × 13 (liquid rubber) |  |  |  |  |  |
| Aerosil R812 | 3 |  | 5 | 3 | 3 |
| Aerosil RY200 |  | 4 |  |  |  |
| Aerosil 380 |  |  |  |  |  |
| Core shell rubber EXL-2655 |  |  |  |  | 6 |
| 4,4'-DDS | 40 | 40 | 40 | 40 | 34 |
| Modulus of storage rigidity T at 70 to 100° C. |  |  |  |  |  |
| Maximum value G' max (Pa) | 34 | 120 | 45 | 34 | 67 |
| Minimum value G' min (Pa) | 11 | 80 | 10 | 11 | 12 |
| Log (G'max/G'min) | 0.49 | 0.17 | 0.65 | 0.49 | 0.75 |
| Thixotropy index[1] | 13 | 10 | 15 | 13 | 15 |
| Viscosity at 80° C. (poises) | 200 | 300 | 250 | 200 | 380 |
| Minimum viscosity (poises) | 90 | 70 | 110 | 90 | 210 |
| CF woven fabric type | T700-12K | T700-12k | T700-12K | T300-3K | T700-12K |
| Prepreg cover factor (%) | 99.6 | 99.6 | 99.5 | 97.5 | 98.3 |
| Tackiness (MP1) |  |  |  |  |  |
| 0-day | 0.15 | 0.14 | 0.14 | 0.12 | 0.12 |
| 10-day | 0.11 | 0.10 | 0.07 | 0.07 | 0.10 |
| Drapability (GPa) | 3.1 | 2.9 | 3.8 | 3.8 | 32 |
| Flatwise tensile strength (MPa) | 3.76 | 3.72 | 3.59 | 3.46 | 3.89 |
| Peel strength (lb-inch/3-inch)[4] | 16.2 | 14.3 | 14.5 | 15.0 | 20.1 |
| Porosity in skin panel (%) | 0.1 | 0.2 | 0.4 | 0.2 | 0.1 |
| Skin panel surface roughness (μm) | 5.6 | 9.7 | 8.8 | 10.4 | 7.4 |
| Coefficient of water absorption (wt %)[2] | 1.4 | 1.3 | 1.4 | 1.4 | 1.5 |
| H/W compressive strength[3] (MPa) | 517 | 559 | 517 | 510 | 406 |
| Hardened resin Tg (° C.) | 216 | 208 | 215 | 216 | 190 |

|  | Example | | | | comparative Example | | | |
|---|---|---|---|---|---|---|---|---|
|  | 6 | 7 | 8 | 9 | 1 | 2 | 3 | 4 |
| ENM 434 | 40 | 40 | 40 | 40 | 20 | 20 | 30 | 30 |
| Ep 828 | 30 | 30 | 30 | 30 | 50 | 50 |  |  |
| Epc 830 | 10 | 10 | 10 | 10 |  |  | 40 | 40 |
| Epc 152 |  |  |  |  |  |  | 30 | 30 |
| ESCN 220 | 20 | 20 | 20 | 20 | 30 | 30 |  |  |
| Ep 1001 |  |  |  |  |  |  |  |  |
| NIPOL1072 (solid rubber) | 4.5 | 4.5 |  |  | 4.0 | 8.5 |  |  |
| NIPOL1472HV (solid rubber) |  |  | 4.5 | 4.5 |  |  | 2.7 |  |
| HvcarCTBN 1300 × 13 (liquid rubber) |  |  |  |  |  |  |  | 5 |
| Aerosil R812 | 5 | 5 | 10 |  |  |  |  |  |
| Aerosil RY200 |  |  |  |  |  |  |  |  |
| Aerosil 380 |  |  |  |  |  |  | 0.8 | 4 |
| Core shell rubber EXL-2655 |  |  |  | 5 |  |  |  |  |
| 4,4'-DDS | 40 | 40 | 40 | 40 | 40 | 40 | 40 | 40 |
| Modulus of storage rigidity T at 70 to 100° C. |  |  |  |  |  |  |  |  |
| Maximum value G' max (Pa) | 70 | 70 | 250 | 120 | 28 | 220 | 30 | 34 |
| Minimum value G' min (Pa) | 24 | 24 | 110 | 50 | 2.4 | 1.0 | 2.4 | 1.1 |
| Log (G'max/G'min) | 0.46 | 0.46 | 0.36 | 0.38 | 1.07 | 1.35 | 1.10 | 1.49 |
| Thixotropy index[1] | 14 | 14 | 32 | 13 | 1.9 | 2.1 | 2.2 | 4.2 |
| Viscosity at 80° C. (poises) | 210 | 210 | 320 | 190 | 76 | 520 | 240 | 100 |
| Minimum viscosity (poises) | 80 | 80 | 130 | 80 | 5 | 85 | 15 | 10 |
| CF woven fabric type | T700-12K | T700-12K | T700-12K | T700-12K | T700-12K | T700-12K | T700-12K | T700-12K |
| Prepreg cover factor (%) | 99.5 | 95.2 | 99.4 | 95.2 | 97.9 | 98.1 | 99.0 | 98.6 |
| Tackiness (MP1) |  |  |  |  |  |  |  |  |
| 0-day |  | 0.15 | 0.15 | 0.15 | 0.17 | 0.18 | 0.15 | 0.11 |
| 10-day | 0.11 | 0.10 | 0.11 | 0.08 | 0.03 | 0.04 | 0.04 | 0.01 |
| Drapability (GPa) | 3.1 | 3.1 | 3.6 | 3.2 | 2.7 | 3.1 | 2.8 | 2.7 |

TABLE 1-continued

| | | | | | | | | |
|---|---|---|---|---|---|---|---|---|
| Flatwise tensile strength (MPa) | 3.44 | 3.39 | 2.58 | 3.04 | 1.73 | 0.83 | 1.52 | 1.38 |
| Peel strength (lb-inch/3-inch)[4] | 15.5 | 15.4 | 11.0 | 14.3 | 8.5 | 7.1 | 6.5 | 3.9 |
| Porosity in skin panel (%) | 0.2 | 0.5 | 0.2 | 0.6 | 1.5 | 0.4 | 1.6 | 3.5 |
| Skin panel surface roughness (μm) | 9.6 | 10.8 | 7.7 | 11.3 | 35.3 | 25.1 | 32.9 | 38.2 |
| Coefficient of water absorption (wt %)[2] | 1.4 | 1.4 | 1.2 | 1.7 | 1.4 | 1.4 | 1.4 | 1.4 |
| H/W compressive strength[3] (MPa) | 524 | 520 | 530 | 419 | 509 | 398 | 516 | 411 |
| Hardened resin Tg (° C.) | 218 | 218 | 217 | 216 | 215 | 214 | 218 | 201 |

[1] Viscosity ratio measured at 70° C. at 100% strain ($\eta 0.01/\eta 1.0$)
[2] Coefficient of water absorption of CFRP after immersion in hot water for 2 weeks at 160 F.
[3] CFRP compressive strength at 200 F. after immersion in hot water for 2 weeks at 160 F. (measured red according to ASTM D 695)
[4] Measured according to climbing drum peel test (ASTM D 1781)

We claim:

1. A resin composition for a fiber reinforced composite material comprising an epoxy resin, a curing agent and an additive that changes viscoelasticity of the resin composition, said resin composition having a modulus of storage rigidity G' of 5 to 200 Pa in a temperature range of 70° C. to 100° C. when said G' is measured by a parallel plate rheometer at a vibration frequency of 0.5 Hz with a temperature rise of 1.5° C./min from a starting temperature of 50° C., said additive that changes viscoelasticity of the resin composition comprising inorganic particles of an average particle size of 40 nm or less.

2. A resin composition for a fiber reinforced composite material comprising an epoxy resin, a curing agent and an additive that changes viscoelasticity of the resin composition, said resin composition having a minimum modulus of storage rigidity $G'_{min}$ and a maximum modulus of storage rigidity $G'_{max}$ in a temperature range of 70° C. to 100° C. when said $G'_{min}$ and said $G'_{max}$ are measured by a parallel plate rheometer at a vibration frequency of 0.5 Hz with a temperature rise of 1.5° C./min from a starting temperature of 50° C. min, wherein $\log_{10}(G'_{max}/G'_{min}) \leq 0.9$, said additive that changes viscoelasticity of the resin composition comprising inorganic particles of an average particle size of 40 nm or less.

3. A resin composition for a fiber reinforced composite material comprising an epoxy resin, a curing agent and an additive that changes viscoelasticity of the resin composition, said resin composition having a thixotropy index in a range of 2.5 to 40 and a resin viscosity of 100 to 1000 poises at 80° C. when said resin viscosity is measured by a parallel plate rheometer at a vibration frequency of 0.5 Hz with a temperature rise of 1.5° C./min from a starting temperature of 50° C., said additive that changes viscoelasticity of the resin composition comprising inorganic particles of an average particle size of 40 nm or less.

4. The resin composition for a fiber reinforced composite material according to any one of claims 1, 2 or 3, wherein the additive that changes viscoelasticity of the resin composition further comprises an ingredient selected from the group consisting of a solid rubber, a thermoplastic elastomer and a thermoplastic resin.

5. The resin composition for a fiber reinforced composite material according any one of claims 1, 2 or 3, further comprising a solid butadiene acrylonitrile rubber and wherein the inorganic particles are fine silica particles.

6. A resin composition for a fiber reinforced composite material comprising an epoxy resin, a curing agent and an additive that changes viscoelasticity of the resin composition, wherein the additive that changes viscoelasticity of the resin composition comprises a solid rubber in an amount of 1 to 10 wt % and fine silica particles in an amount of 1 to 10 wt %, respectively, based on the total weight of the resin composition, the fine silica particles having an average particle size of 40 nm or less.

7. The resin composition for a fiber reinforced composite material according to claim 6, wherein the fine silica particles are hydrophobic.

8. A prepreg comprising the resin composition according to claim 1 and reinforcing fibers.

9. The prepreg according to claim 8, wherein the reinforcing fibers are carbon fibers.

10. The prepreg according to claim 8, wherein the reinforcing fibers are carbon fibers having a tensile strength of 4.4 GPa or more.

11. The prepreg according to claim 9, wherein the reinforcing fibers are fibers in a woven fabric.

12. The prepreg according to claim 11, wherein the woven fabric has a plain weave structure.

13. The prepreg according to claim 11, wherein the woven fabric comprises flat carbon fiber multifilament yarns having a hook drop value of 80 to 1000 mm.

14. The prepreg according to claim 11, wherein the woven fabric comprises multifilament yarns having a thickness of 0.05 to 0.2 mm and a ratio of yarn width to yarn thickness of 30 or more.

15. The prepreg according to claim 11, wherein the woven fabric weighs 100 to 320 g/m² and the prepreg is of a thickness in a range of 0.15 to 0.35 mm.

16. The prepreg according to claim 11, wherein the woven fabric comprises weave meshes comprising clearances formed between warps and wefts in the woven fabric, the weave meshes are closed and a cover factor Kp is in a range of 96 to 99.9%.

17. A fiber reinforced composite material made by curing the prepreg of claim 8.

18. A honeycomb structure made from the fiber reinforced composite material of claim 17.

19. A resin composition for a fiber reinforced composite material according to claim 4, wherein the solid rubbers are solid butadiene acrylonitrile rubber and core shell rubber particles and the inorganic material is fine silica particles.

20. A resin composition for a fiber reinforced composite material according to claim 4, wherein the solid rubbers are solid acylonitrile butadiene rubber and core shell rubber particles.

21. A process for producing a resin composition for a reinforced fiber composite material according to any one of claims 1, 2, 3 or 6 comprising the step of mixing the additive with the epoxy resin for executing a preliminary reaction at 70° C. to 120° C. for 30 minutes or more.

22. A process for producing resin composition for a reinforced fiber composite material according to claim 21, wherein the additive is a solid rubber and the additive compuses are carboxyl groups.

* * * * *